Patented Jan. 18, 1944

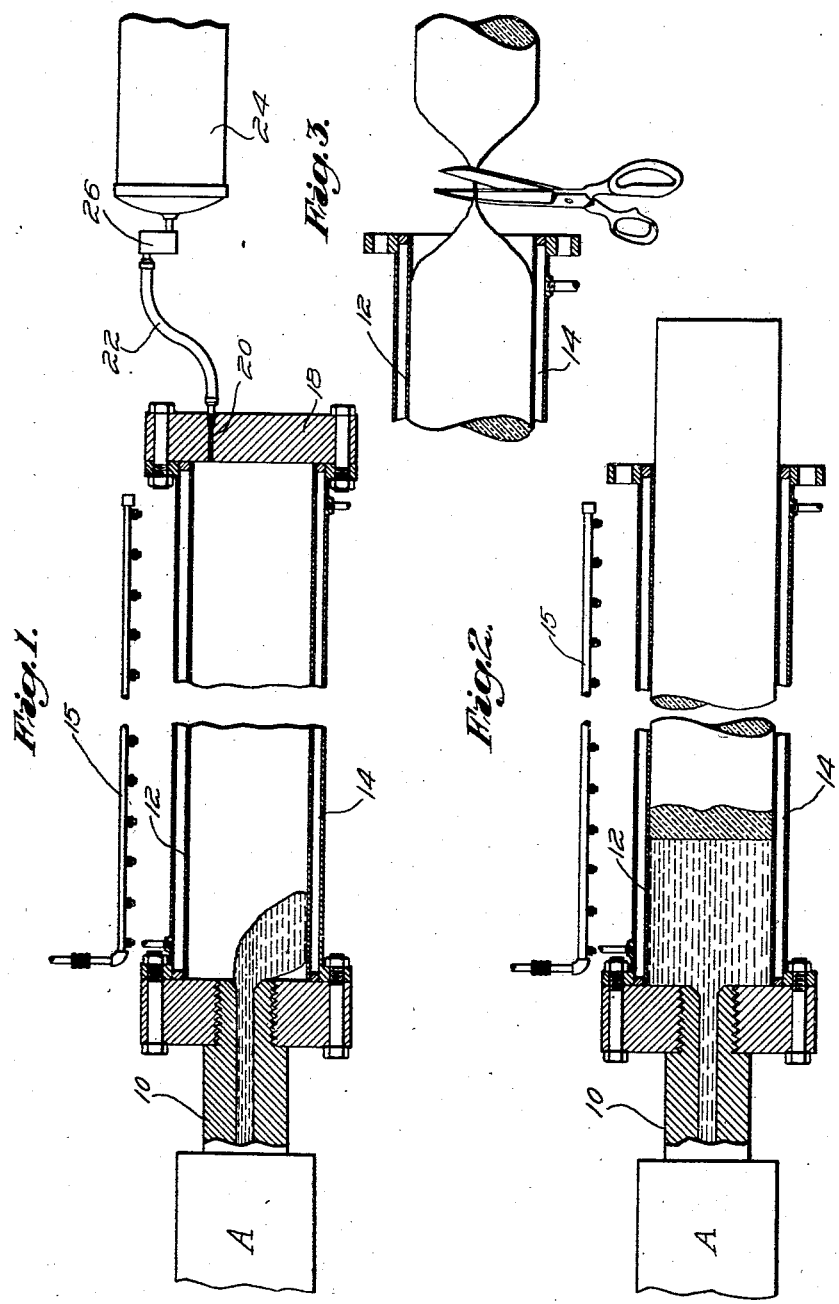

2,339,452

UNITED STATES PATENT OFFICE 2,339,452

METHOD OF MOLDING PLASTIC SLUGS

James Bailey, West Hartford, and Raymond S. Jesionowski, Hartford, Conn., assignors to Plax Corporation, Hartford, Conn., a corporation of Delaware Application August 18, 1942, Serial No. 455,190

2 Claims. (Cl. 18—55)

The present invention relates to the method for molding plastic objects and, particularly, objects having substantial diameter or thickness, such as cylindrical slugs or large slabs.

More particularly, the invention relates to the method for molding such objects from plastic materials of the type having a gas phase, such, for example, as polystyrene and polymethyl methacrylate. In each of these materials, the monomer, styrene of the former and methyl methacrylate of the latter, may be present or formed as a gas. In addition, other gaseous constituents may be present, formed, and released, such as ethyl benzene which may be present in polystyrene.

It has heretofore been the practice to inject such materials from injection means in which the plastic is subjected to high pressure and temperature into molds at atmospheric pressure. With this practice, when the plastic enters the mold, it is released from the high pressure of the injecting means to atmospheric pressure, which pressure is below that at which the gas phase of the material forms. Because of this, the gas phase will form and cause foaming of the material, resulting in the trapping of air. Because of the presence of oxygen in the entrapped air, oxidation will occur, discoloring the object, and if moisture is also present, the object will also show spots having a milky appearance. The presence of either of these discolorations constitutes defects requiring the rejection of the object or article.

The object of the present invention is to provide a method wherein such objects may be molded without the formation of the gas phase, thereby eliminating the entrapping of air whereby the finished objects will be free of the above described defects. In accordance with the method herein, the plastic is injected into a mold, which mold is conditioned by filling it with an inert gas to render the same oxygen and moisture free. In addition, the inert gas within the mold is maintained at a pressure greater than the partial pressure at which the gas phase separates from the plastic at the temperature of operation. Although the method for accomplishing the foregoing is particularly useful in the production of slugs having a diameter of 2½ inches or more and slabs having a thickness of ½ inch or more, it is also useful in the production of any articles wherein the plastic from which the articles are molded has a gas phase.

In accordance with the present invention, it is also possible to make a succession of defect free objects for, by eliminating the forming of the gas phase in an initially made object or slug, the initially made slug may be ejected from the mold by filling the mold behind the slug to form a subsequent slug, the initial slug providing enough back pressure to prevent the formation of the gas phase.

In carrying out the method, the apparatus disclosed in the copending application of James Bailey, Serial No. 426,814, may be used in the making of slugs of substantial length and cross sectional area. However, for an understanding of the method herein, the accompanying drawing, which schematically shows the above described apparatus, will be sufficient.

In the drawing:

Figure 1 is a view illustrating the conditioned mold for the forming of an initial slug;

Fig. 2 is a view of a finished slug being ejected from the mold by the forming of a second slug; and Fig. 3 is a view showing the manner in which the rear end of one slug may be severed from the forward end of the next succeeding one.

Referring to the drawing, A indicates an injecting device of any suitable type such as shown in the above indicated application, said device reducing the powdered material to plastic condition under heat and pressure and forcing it through an injection nozzle 10 into a mold 12. The mold 12 is of the type utilized in producing cylindrical slugs of substantial length and cross sectional area. As usual, the mold is provided with a jacket 14 through which a suitable heating fluid may be circulated, and also associated therewith is a cooling means 15, such as water sprays, for reducing the temperature following the filling of the mold. To close the mold at the ejection end, there is provide a closure 18 which may be removably secured thereon in any suitable way. As seen in Fig. 1, the closure 18 is provided with a passage 20 adapted to connect to the tube 22 through which an inert gas may be fed to the mold from a tank 24 in which the gas is stored under high pressure. The pressure of the gas is controlled by an automatically operated pressure control valve, indicated at 26, and arranged at the outlet of the tank 24. In carrying out the present method, the interior of the mold 12 is (prior to placing of the closure 18 thereon) swept out with the inert gas to render the mold oxygen and moisture free.

Following the sweeping out of the mold, the closure 18 is secured, as shown in Fig. 1, whereupon gas is then fed into the mold to place the gas under pressure, the pressure being controlled by the valve 26. As previously stated, the pressure within the mold is maintained greater than the partial pressure at which the gas will separate from the plastic at the temperature of operation. With the mold so conditioned, it will be seen that the plastic, upon entering same, will enter an oxygen and moisture free medium and be maintained under sufficient back pressure to prevent foaming, thus eliminating the defects which result when the plastic is injected into a mold at atmospheric pressure. As the plastic fills the mold, the inert gas will be displaced, there being sufficient leakage through the mold structure to allow the escape of gas but, if desired, a pressure controlled exhaust vent may be utilized. When the mold has been completely filled, it is gradually cooled from the ejection to the injection end, the feeding of the plastic being continued to compensate for shrinkage. Thereafter, the closure 18 is removed and the slug ejected from the mold.

As an example of actual operation, polystyrene, subjected to approximately 1500 pounds per square inch in the injection device and at a temperature in the region of approximately 400° F., is injected into molds having a diameter of three inches. In this instance, the mold is initially swept out with nitrogen, although carbon dioxide or any other suitable inert gas may be used. Following the sweeping out of the mold and the closing of same, the gas pressure within the mold is built up to approximately sixty pounds, which pressure is sufficient to prevent the formation of the gas phase in polystyrene at the temperature of operation, namely approximately 400°. As a result, the gas phase cannot form, and thus a homogeneous finished slug is obtained.

As previously stated, when a slug has been initially molded in a mold conditioned in the manner described, it may be ejected from the mold by the incoming plastic material, which material fills the mold as it ejects the slug. In this instance, the resistance of the first slug to being ejected will be sufficient to create a back pressure preventing the formation of the gas phase in the material being injected into the mold. Following the ejection of the initial slug, the mold is again closed and cooled to finish the slug, whereupon the mold is again opened and the second slug ejected by the incoming material. The ejected slug may be pulled forward to draw the material between the ejected slug and the second one into a narrow neck which may be severed by a pair of scissors or the like, as shown in Fig. 3. This injection-ejection step may be continued until the mold requires lubrication or cleaning. In cases where the plastic may contain a lubricant, continuous operation may be maintained indefinitely. Once it becomes necessary to empty the mold, the method is repeated by initially conditioning the mold in the manner described.

We claim as our invention:

1. The method of molding articles from polymerized plastic material having a gas phase, which comprises filling the mold with an inert gas to render the mold oxygen and moisture free, maintaining the gas in the mold at a pressure greater than the pressure at which the gas phase of the material forms, injecting the polymerized plastic material into the gas filled mold until the mold is completely filled, causing the plastic material injected into the mold to expell the inert gas therefrom while maintaining a pressure on the gas within the mold greater than the pressure at which the gas phase of the material forms, and cooling the mold after it has been filled with the plastic material while maintaining the plastic material under the pressure applied for injecting the material into the mold.

2. The method of molding articles from polymerized plastic material having a gas phase, which comprises conditioning the mold by initially sweeping the unfilled mold with an inert gas, closing the mold, maintaining within the mold the inert gas under pressure greater than the pressure at which the gas phase of the plastic forms, then injecting the polymerized plastic material into the mold to completely fill the same, expelling the inert gas from the mold by the plastic material injected thereinto while maintaining the gas under pressure greater than the pressure at which the gas phase of the plastic forms, and cooling the mold after it has been filled with the plastic material while maintaining the plastic material under the pressure applied for injecting the material into the mold.

JAMES BAILEY.
RAYMOND S. JESIONOWSKI.